(12) United States Patent
Shinomiya et al.

(10) Patent No.: US 7,188,280 B2
(45) Date of Patent: Mar. 6, 2007

(54) PROTECTING ROUTE DESIGN METHOD IN A COMMUNICATION NETWORK

(75) Inventors: Norihiko Shinomiya, Kawasaki (JP); Keiji Miyazaki, Kawasaki (JP); Yasuki Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 715 days.

(21) Appl. No.: 09/942,217

(22) Filed: Aug. 29, 2001

(65) Prior Publication Data

US 2002/0138645 A1  Sep. 26, 2002

(30) Foreign Application Priority Data

Mar. 21, 2001  (JP) ............... 2001-080087

(51) Int. Cl.
*G06F 11/00* (2006.01)
(52) U.S. Cl. .................. 714/43; 709/239; 370/225; 398/5
(58) Field of Classification Search .............. 714/4, 714/43; 709/239; 370/217, 225; 398/2, 398/1, 5
See application file for complete search history.

(56) References Cited

U.S. PATENT DOCUMENTS

| | | | |
|---|---|---|---|
| 5,495,471 A * | 2/1996 | Chow et al. | 370/221 |
| 5,999,517 A * | 12/1999 | Koning et al. | 370/255 |
| 6,011,780 A * | 1/2000 | Vaman et al. | 370/237 |
| 6,289,096 B1 * | 9/2001 | Suzuki | 379/221.01 |
| 6,430,150 B1 * | 8/2002 | Azuma et al. | 370/218 |
| 6,496,476 B1 * | 12/2002 | Badt et al. | 370/228 |
| 6,725,401 B1 * | 4/2004 | Lindhorst-Ko | 714/47 |
| 6,728,205 B1 * | 4/2004 | Finn et al. | 370/217 |
| 6,947,377 B1 * | 9/2005 | Shimano et al. | 370/228 |
| 2001/0003833 A1 * | 6/2001 | Tomizawa et al. | 709/240 |
| 2002/0093954 A1 * | 7/2002 | Weil et al. | 370/389 |

OTHER PUBLICATIONS

Y. Fujii, et al. "A Study on Path Restoration Method Based on Pre-Planned Configuration" Technical Report of IEICE pp. 67-72.

* cited by examiner

*Primary Examiner*—Scott Baderman
*Assistant Examiner*—Paul Contino
(74) *Attorney, Agent, or Firm*—Katten Muchin Rosenman LLP

(57) ABSTRACT

A protecting route design method is disclosed for a communication network including a plurality of nodes having preset information on a protecting route to switch over in parallel from a working route thereto when link or node failure occurs, according to a failure notification message including failure location information being transmitted from a failure detection node to each node. The protecting route design method includes the steps of searching a protecting route which can minimize a transfer time of the failure notification message from the failure detection node; and then, updating the searched protecting route to a protecting route having a spare communication capacity sharable for a different failure and having a route switchover time to be completed within a given time limit.

11 Claims, 18 Drawing Sheets

FIG. 10

Restoration time investigation table related to node 'N8'

| Failure location 61 | Failure detection node 62 | Restoration time upper limit (ms) 63 | Reception time of failure notification message (ms) 64 | Route switchover time (ms) 65 |
|---|---|---|---|---|
| Link L1 (N1,N4) | N1 | 50 | 8.75 | 41.25 |
| | N4 | 50 | 4.50 | 45.50 |
| Link L2 (N2,N5) | N2 | 50 | 3.25 | 46.75 |
| | N5 | 50 | 10.0 | 40.00 |
| Link L3 | ... | 50 | ... | ... |

FIG. 13

Protecting communication route information table

| Failure location 71 | Damaged transmission node 72 | Damaged reception node 73 | Protecting communication route 74 |
|---|---|---|---|
| Link L1 (N1,N4) | N1 | N4 | Path141 |
| | N4 | N1 | Path411, Path412 |
| | N1 | N7 | Path171 |
| | N2 | N4 | Path241, Path242, |
| | ... | ... | ... |
| Link L2 (N2,N5) | N2 | N5 | Path251 |
| | N5 | N2 | Path521, Path522 |
| | ... | ... | ... |
| Link L3 ... | ... | ... | ... |

FIG. 15

| Network scale | North America | Path length approx. 3000km |
| --- | --- | --- |
| | Metropolitan area | Path length approx. 30km |
| Switchover system | Optical | Approx. 5.0e-3 sec |
| | Electric | Approx. 5.0e-9 sec |
| Message processing capability in a node (CPU capability) | '98 | Approx. 1.0e-3 sec |
| | '01 | Approx. 1.0e-4 sec |

※Optical communication delay of 4.833e-6 sec/km is constantly fixed.

Fig. 16

| Network scale | North America (large) | Metropolitan area (small) |
|---|---|---|
| Switchover system | | |
| Optical | | Communication delay neglected |
| Electric | Switchover time neglected | |

FIG. 18

| | Spare factor | Average notification time | Maximum notification time |
|---|---|---|---|
| Time limit existent | 41.5 | 18.767 | 24.7 |
| Time limit non-existent | 38.0 | 21.836 | 37.1 |

PROTECTING ROUTE DESIGN METHOD IN A COMMUNICATION NETWORK

FIELD OF THE INVENTION

The present invention relates to a method for designing protecting route in a communication network which enables to restore communication promptly from a failure in a communication route without increasing required spare communication capacity.

BACKGROUND OF THE INVENTION

With increased demand for and variety of the Internet services, communication traffic transmitted in a backbone network continues to increase remarkably. To cope with this trend, a backbone network having larger capacity with higher transmission speed is being constructed based on new technologies such as the wavelength division multiplexing (WDM).

Also, the development of an optical cross-connect (OXC) and an optical add-drop multiplexer (OADM) is currently in progress aiming at efficient operation of a mesh network employing flexible control with shared spare (protection) wavelengths. Through these technologies, the implementation of new communication infrastructure and new services is expected.

In a large-scale WDM network, communication damages caused by a failure is increasing as services provided by a system increases. In order to improve the system reliability, development of an advanced network management system becomes a key issue. A technology for prompt service restoration in an optical layer when a link or node fails is important among others.

The inventors of the present invention have been studying a pre-plan type failure restoration system which enables prompt service restoration when a WDM network fails. (Reference: FUJII, Y., MIYAZAKI, K., and ISEDA, K.: "A study on a pre-plan type failure restoration system", Technical Report of the Institute of Electronics, Information and Communication Engineers (IEICE), TM2000-60, Nov. 2000, pp. 67–72.)

In such a pre-plan type failure restoration system, failure information originated from a node having detected a failure is transferred to a neighboring node then successively to a next neighboring node ('flooding') in which predetermined protecting route information is preset. Each node switches over a route in parallel according to the preset protecting route information, enabling to shorten a time for the dynamic protecting route search. Thus prompt service restoration is realized.

However, even a parallel route switchover is possible, it may still be a problem if substantially long time is consumed before each node along the protecting route receives the failure information.

In addition, when designing a pre-determined protecting route, conventional methods mainly aim to minimize the number of total spare wavelengths (resources) only.

SUMMARY OF THE INVENTION

Accordingly, it is an object of the present invention, when designing a protecting route of a pre-plan type failure restoration system, to provide a protecting route design method for a communication network which enables to reduce a transfer time (flooding time) of a failure notification message to each node by setting limitation on a transfer time, thus realizing prompt service restoration, as well as to minimize the required number of spare wavelengths.

A protecting route design method according to the present invention is for a communication network consisting of a plurality of nodes wherein a protecting route information is preset in each node, and when link or node failure occurs, a failure detection node transfers a failure notification message including failure location information to each node to enable to switch over in parallel from a working route according to the received failure notification information. First, a protecting route which can minimize a transfer time of the failure notification message from the failure detection node is searched. Then, the searched protecting route is updated to another protecting route of which spare communication capacity can be shared for a different failure and route switchover can be completed within a given time limit.

As an embodiment of the protecting route design method according to the present invention to solve the aforementioned problems, the transfer time of the failure notification message from the failure detection node is calculated from a summation of a transmission delay time of the failure notification message being transmitted on communication links and an input and output processing time of the failure notification message processed in each node.

Further, as an embodiment of the protecting route design method according to the present invention to solve the aforementioned problems, a switchover time to a protecting route in each node is calculated from a difference between a given restoration time limit and a transfer time of the failure notification message to each node.

Still further, as an embodiment of the protecting route design method according to the present invention, a restoration time of a protecting route is obtained by calculating a summation of the transfer time of a failure notification message to each node and a switchover time to the protecting route in each node, then by extracting the maximum value of the summation for entire nodes along the protecting route.

Still further, as an embodiment of the protecting route design method according to the present invention, another protecting route is searched between the end nodes of the route, excluding a link which has not any sharable spare communication capacity.

Still further, as an embodiment of the protecting route design method according to the present invention, another protecting route is searched between the end nodes of the route, giving priority on a link which has a large sharable spare communication capacity.

Still further, as an embodiment of the protecting route design method according to the present invention, at the time of searching another protecting route giving priority on a link which has large sharable spare communication capacity, there is temporarily set to a link on a working route a sharable spare communication capacity value which exceeds any value assigned to other link, so as to reduce a transfer time of a failure notification message from a failure detection node to each node on the protecting route.

Still further, as an embodiment of the protecting route design method according to the present invention, another protecting route is searched excluding a node at which a transfer time of the failure notification message exceeds a predetermined restoration time, so as to reduce a route search time.

Still further, as an embodiment of the protecting route design method according to the present invention, any of the following calculation may selectively be employed according to the topology or a scale of an object communication network, a node equipment specification, and a communication system: the calculation of; a transfer time of a failure notification message; a switchover time to a protecting route; or a restoration time of a protecting route.

Further scopes and features of the present invention will become more apparent by the following description of the embodiments with the accompanied drawings.

BRIEF DESCRIPTION OF THE DRAWINGS

FIG. 10 shows a data structure diagram according to an embodiment of the present invention, illustrating a table for indicating a restoration time from the occurrence of a failure.

FIG. 13 shows an example of an information table indicating alternate communication route information updated by the processing shown in FIG. 12.

FIG. 15 shows an item of a communication network to which the protecting route design is aimed and an example of specific parameters.

FIG. 16 shows a table considering the relation between a network scale and a node switchover method.

FIG. 18 shows a relation between the spare factor and the failure notification time in case whether or not the time limit is introduced.

DETAILED DESCRIPTION OF THE PREFERRED EMBODIMENTS

The preferred embodiments of the present invention are described hereinafter referring to the charts and drawings. For the sake of understanding the present invention, there is described first a pre-plan type failure restoration system in an optical network, at which the present invention is aimed.

Figure 1:
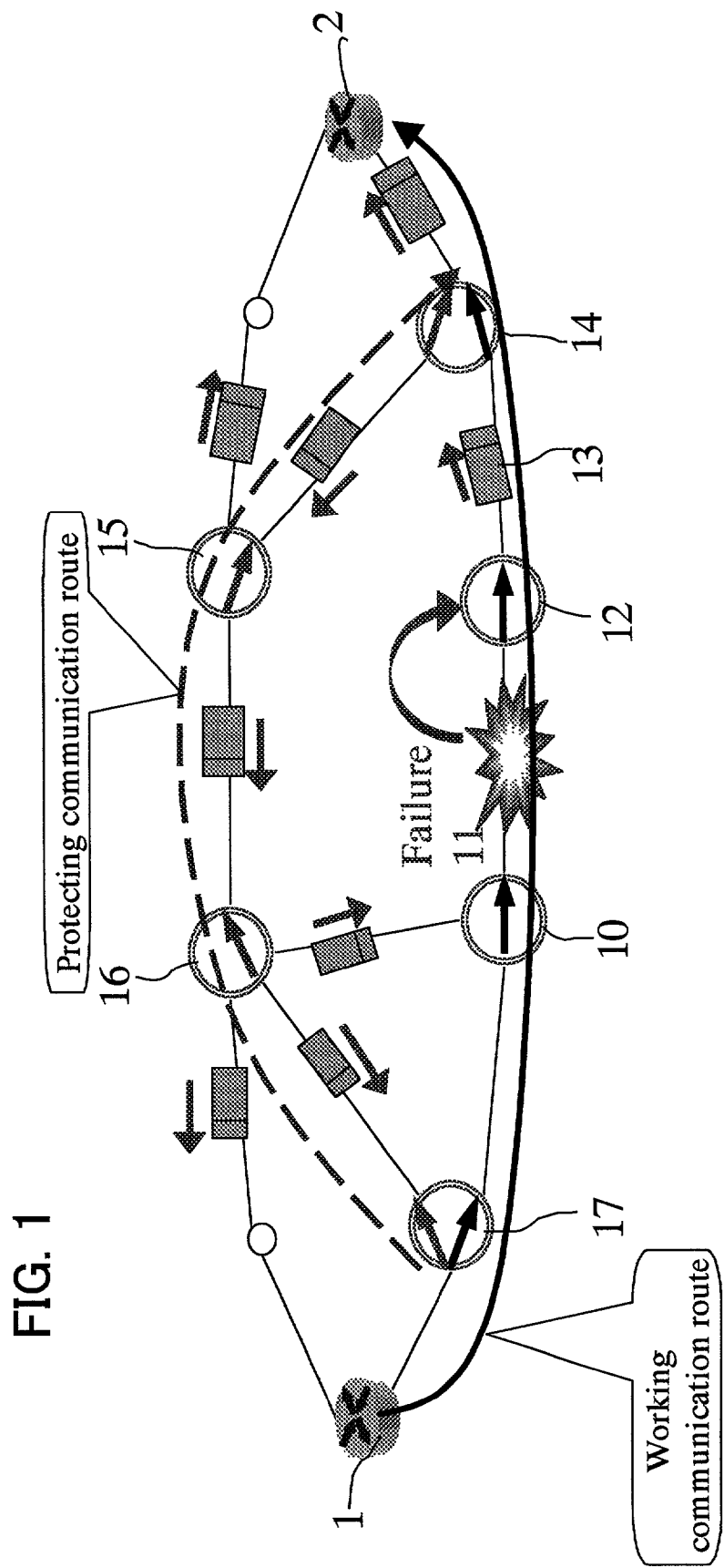
FIG. 1 shows a network example based on an optical path through which an optical signal is transmitted and received between terminal stations.

In FIG. 1, there is shown a network example based on an optical path through which an optical signal is transmitted and received between terminal stations. The optical network transmits and receives a plurality of optical signals being multiplexed into an optical fiber through optical paths between terminal stations, using WDM technology. An optical cross-connect (OXC) is employed for relaying the signals.

In FIG. 1, it is assumed that communication is carried out between optical cross-connects (OXC) 1, 2 on a working communication route through nodes 17, 10, 12 and 14. In this condition, when a failure 11 occurs between nodes 10 and 12, the failure is detected by node 12.

On detection of the failure, node 12 transmits a failure notification message 13 including the information on the failure location to a neighboring node 14. Then node 14 further transfers the message to a next neighboring node 15, thus the information is transferred to the nodes.

Transit nodes 15, 16 along the protecting route and route switchover nodes 14, 17 transfer the failure notification message to all neighboring nodes excluding the node from which the message has been received only when the message is received for the first time.

Then, according to the predetermined protecting route information, a communication route is switched over in parallel. Here, according to such a pre-plan type failure restoration system, it is intended to decrease the number of failure notification messages, as well as performing the switchover in parallel, aiming to reduce a restoration time.

In a conventional pre-plan type failure restoration system, no particular limitation is provided for the protecting route predetermined in each node. Also, the restoration of communication route is not effected until any node along the protecting route receives the failure notification message, even the switchover to the protecting route is completed.

Therefore, if either the protecting route transit node or the route switchover node is located far from the failure detection node, to produce a substantial delay in receiving the failure notification message, this becomes a major cause of delay in the communication route restoration.

Figure 2:
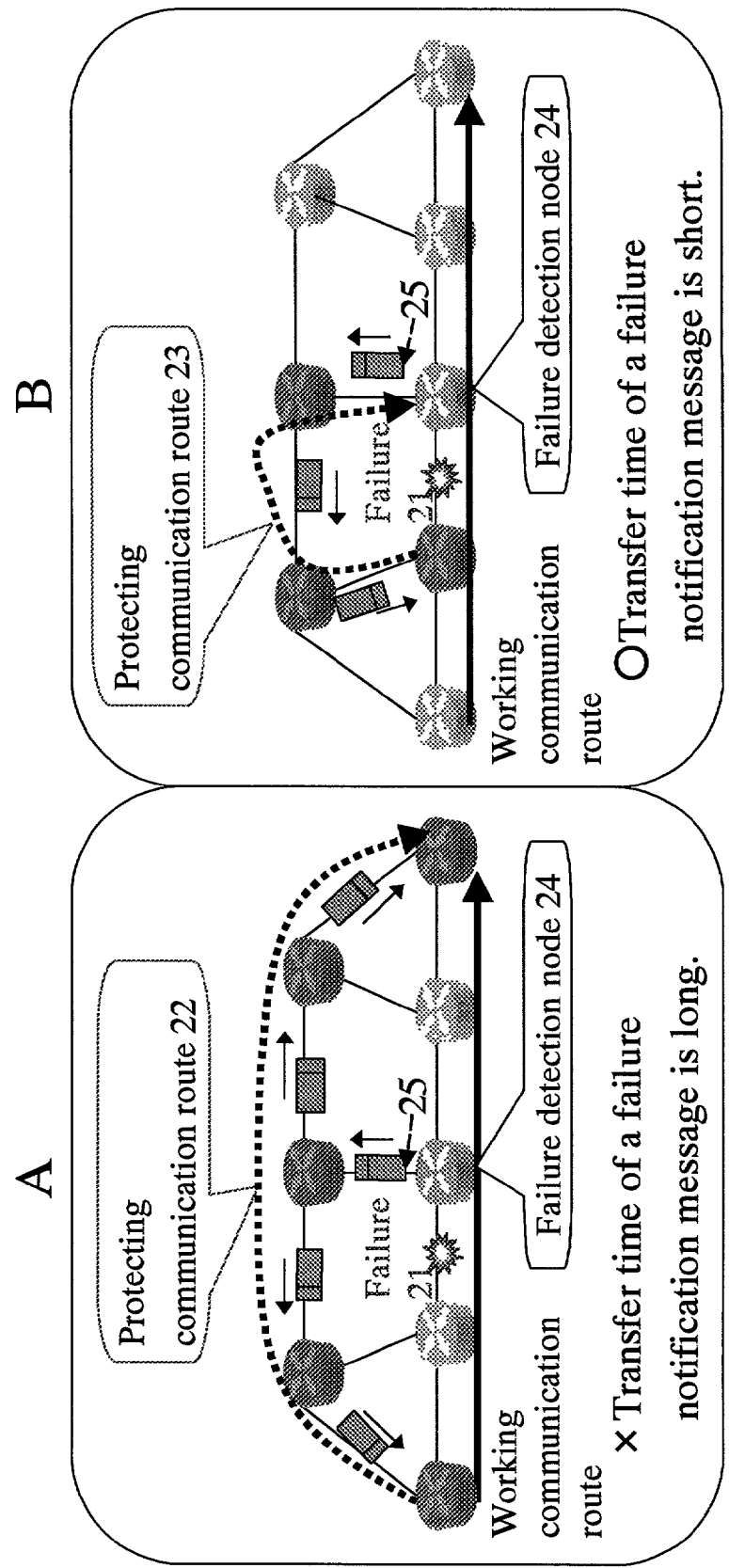
FIG. 2 shows a diagram illustrating an alternate communication route and a transfer time of a failure notification message.

For example, FIG. 2 shows the alternate communication route and the transfer time of failure message transfer time. In FIG. 2-A, an alternate communication route 22 against a failure 21 on the working communication route is shown. Also, in FIG. 2-B, a protecting route 23 against failure 21 is shown.

The information on failure 21 is transmitted through a failure notification message 25 from node 24 having detected the failure. Comparing the above two cases, the transfer time of the failure notification message in FIG. 2-B is shorter than that in FIG. 2-A, thus a faster restoration time can be obtained by using protecting route 23.

In the conventional method of network design, it is aimed to minimize total spare communication capacities, total link distances and total number of hops along a route. Although the above are important factors, it is also necessary to consider the transfer time of a failure notification message in a well balanced manner.

Figure 3:
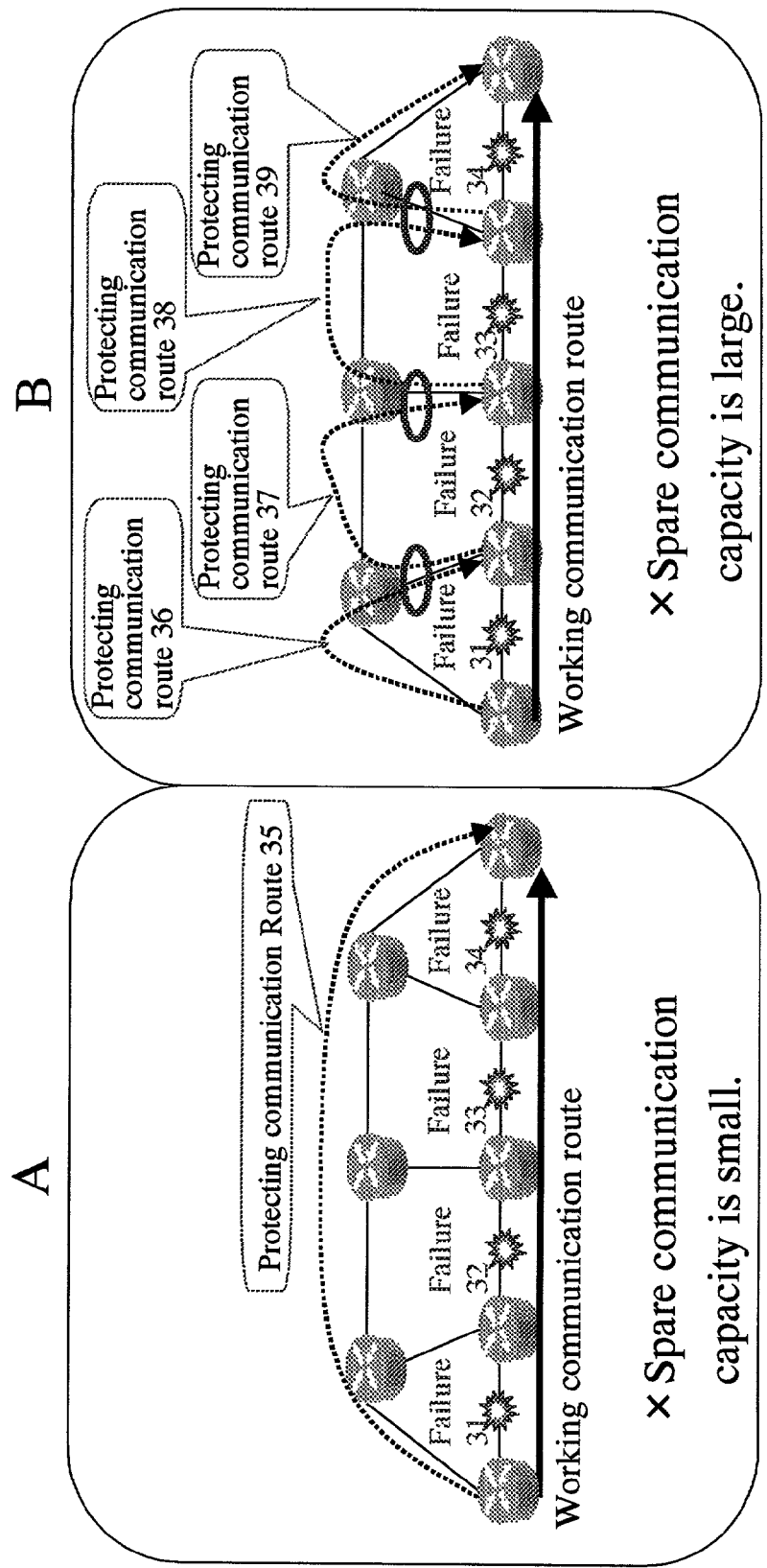
FIG. 3 shows an alternate communication route and desired spare communication capacity therefor.

For example, in FIG. 3, alternate communication routes are illustrated with descriptions of spare communication capacities. In FIG. 3-A, protecting route 35 is provided for circumventing failure 31, 32, 33 or 34 on the working communication route. On the other hand, in the example shown in FIG. 3-B, a variety of alternate communication routes must be set against failures on different locations; protecting route 36 is provided against failure 31, and also protecting route 37, 38 and 39 are provided against failures 32, 33 and 39, respectively. In the case shown in FIG. 3-B, larger spare communication capacities are required, while shorter failure notification time is achieved than in the case shown in FIG. 3-A.

According to the present invention, a processing is proposed taking both the time required for the communication restoration caused by a failure and the spare communication capacity into consideration to improve the protecting route design in the conventional method.

Figure 4:
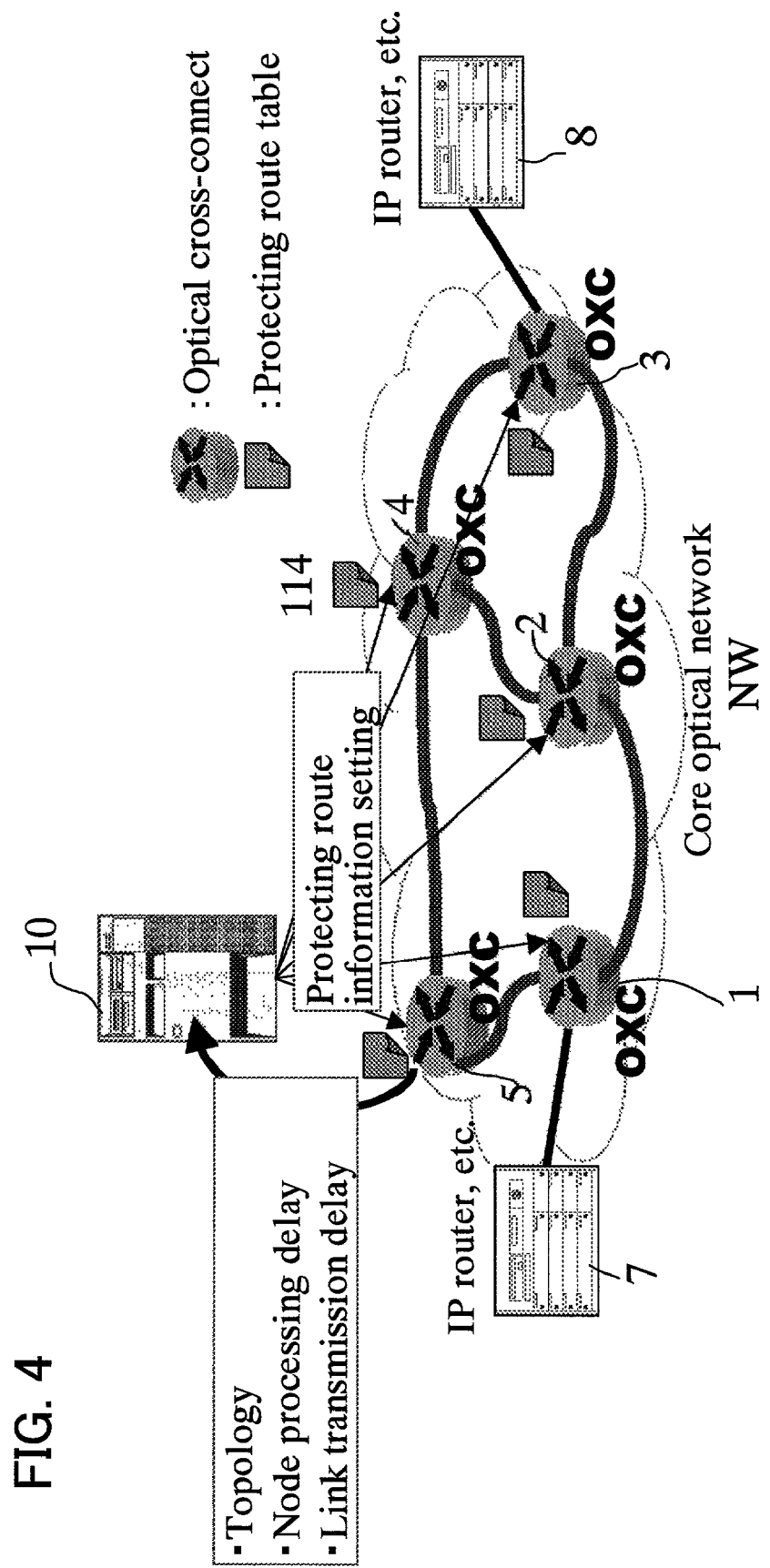
FIG. 4 shows an illustration of failure management of an optical network applying the communication network design method according to the present invention.

In FIG. 4, there is illustrated a failure management in an optical network in which the protecting route design method for a communication network in accordance with the present invention is adopted. A core optical network NW is provided with a plurality of optical cross-connects 1 to 5 mutually connected with optical paths.

This network is further connected to other networks through IP routers 7, 8, etc. In this network, a network management system (NMS) 10 is commonly provided, to set protecting route information into a protecting route table 114 for each node.

Network management system (NMS) 10 collects information on topologies, quantities on node processing delay and link transmission delay for use in the protecting route design.

Figure 5:
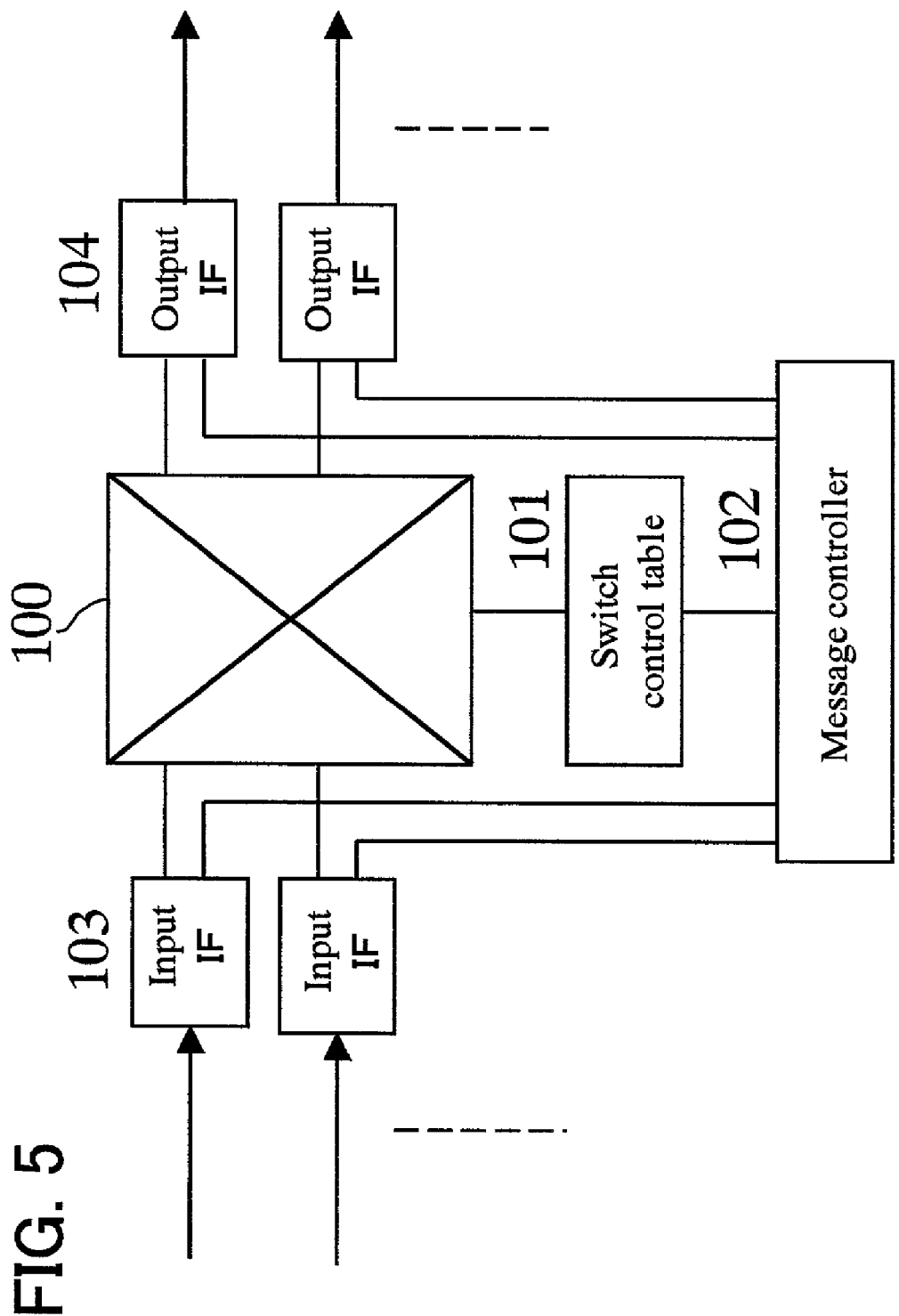
FIG. 5 shows an example of a node configuration block diagram.

In FIG. 5, there is shown an example of a node configuration block diagram applicable to each node 1 to 5 shown in FIG. 4, consisting of an input interface (IF) 103, a switch 100, a switch control table 101, an output interface (IF) 104 and a message controller 102.

There are provided one or more input interfaces 103 to terminate one or more transmission media (for example, optical fibers) each constituting a link to be connected to corresponding nodes. Input interface 103 receives various data input through each communication path included in the terminated link.

Switch 100 switches the connection state between a port in input interfaces 103 and a port in output interfaces 104. More specifically, in each node, a unique channel number is assigned to respective plurality ports provided in input interfaces 103 and output interfaces 104.

Information on the current combinations of channel numbers of the ports in input interfaces 103 and output interfaces 104 are stored in switch control table 101. In switch 100, routing processing for communication paths is carried out according to the combinations.

Accordingly, in order to establish a protecting route when either a link or communication path fails, the communication path condition set in switch 100 is modified by changing the contents of switch control table 101.

There are provided one or more output interfaces 104, similarly to input interfaces 103, to terminate one or more transmission media each constituting a link connected to the corresponding node. Output interface 104 outputs various types of data to each communication path in this terminated link.

Message controller 102 generates a failure notification message when a link or a communication path fails. This failure notification message includes failure location information on a link by link basis and is transmitted to other nodes by means of flooding.

Also, on receiving the message from a neighboring node, message controller 102 performs a switchover processing when necessary, based on protecting route information set in protecting route table 114 in advance by network management system 10.

Figure 6:
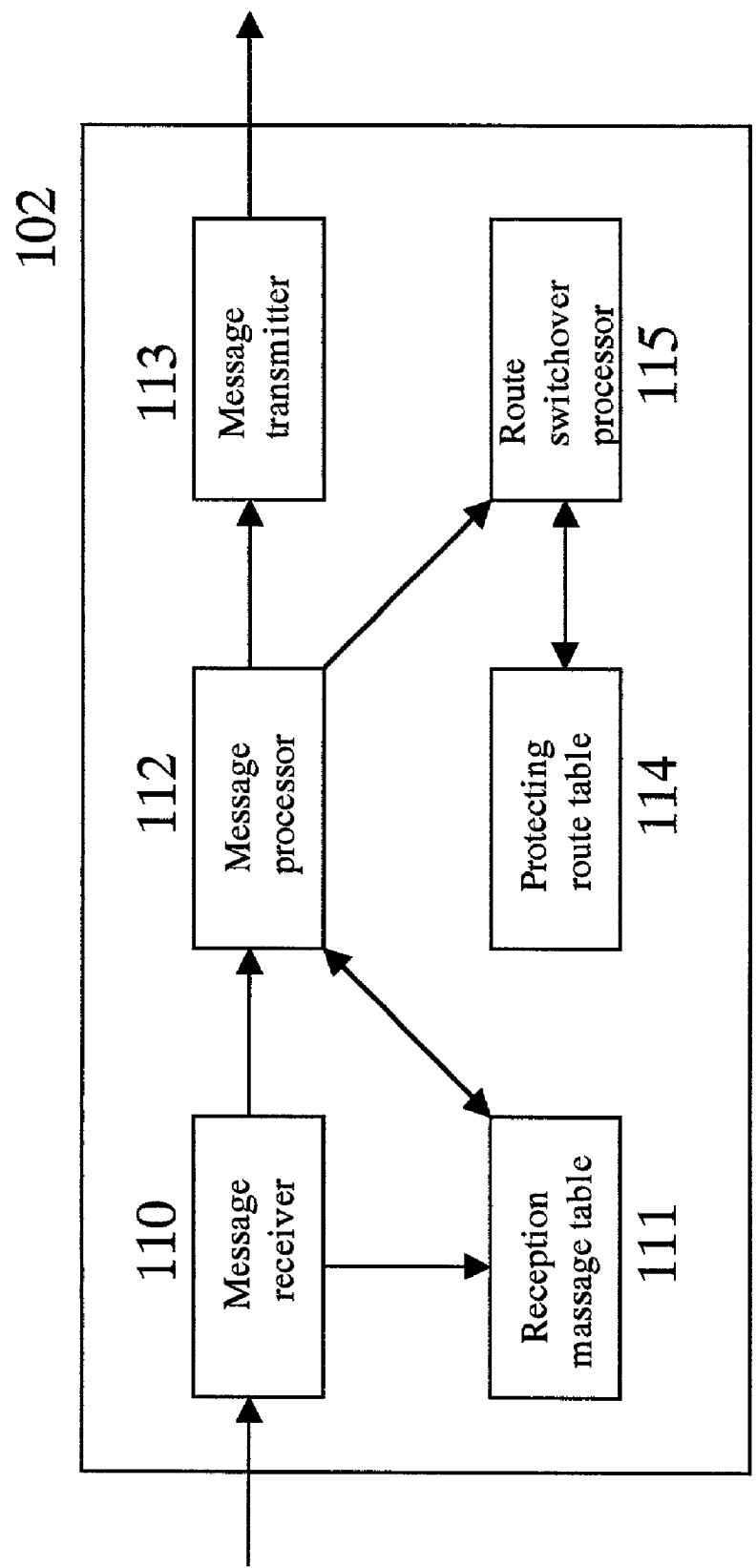
FIG. 6 shows a detailed configuration diagram of a message controller 102.

In FIG. 6, there is shown a detailed configuration of message controller 102. As shown in this figure, message controller 102 includes a message receiver 110, a reception message table 111, a message processor 112, a protecting route table 114, a route switchover processor 115 and a message transmitter 113.

Message receiver 110 receives a message transmitted from a neighboring node. The message includes failure location information specifying the failed link. The message received by message receiver 110 is stored in message reception table 111. When identical messages are received from different nodes, only the message received first is stored.

Message processor 112 verifies whether or not a new message received by message receiver 110 is duplicate with a previously received message. This verification is carried out by searching received messages stored in reception message table 111.

In case of a new message, message processor 112 issues an order to message transmitter 113 to transmit the message. At the same time, an order is sent to the route switchover processor 115 to change a communication path condition using switch 100.

Route switchover processor 115 determines whether or not the relevant node is included in an alternate path using the failure location information included in the received message. If included, route switchover processor 115 sets an alternate path by rewriting the contents of switch control table 101.

Here, the rewrite of switch control table 101 is based on the protecting route setting information corresponding to the failure location. The protecting route setting information is stored in advance in protecting route table 114 by network management system 10.

The protecting route setting information includes a combination of channel numbers of an input and output port in switch 100. This information is for use in setting the protecting route corresponding to a failed link, for example, LX, in case the alternate path to be set against the failure of link LX passes through the node concerned.

Message transmitter 113 transmits the message received from message processor 112 to other neighboring nodes except the neighboring node from which the message was received.

Figure 7:
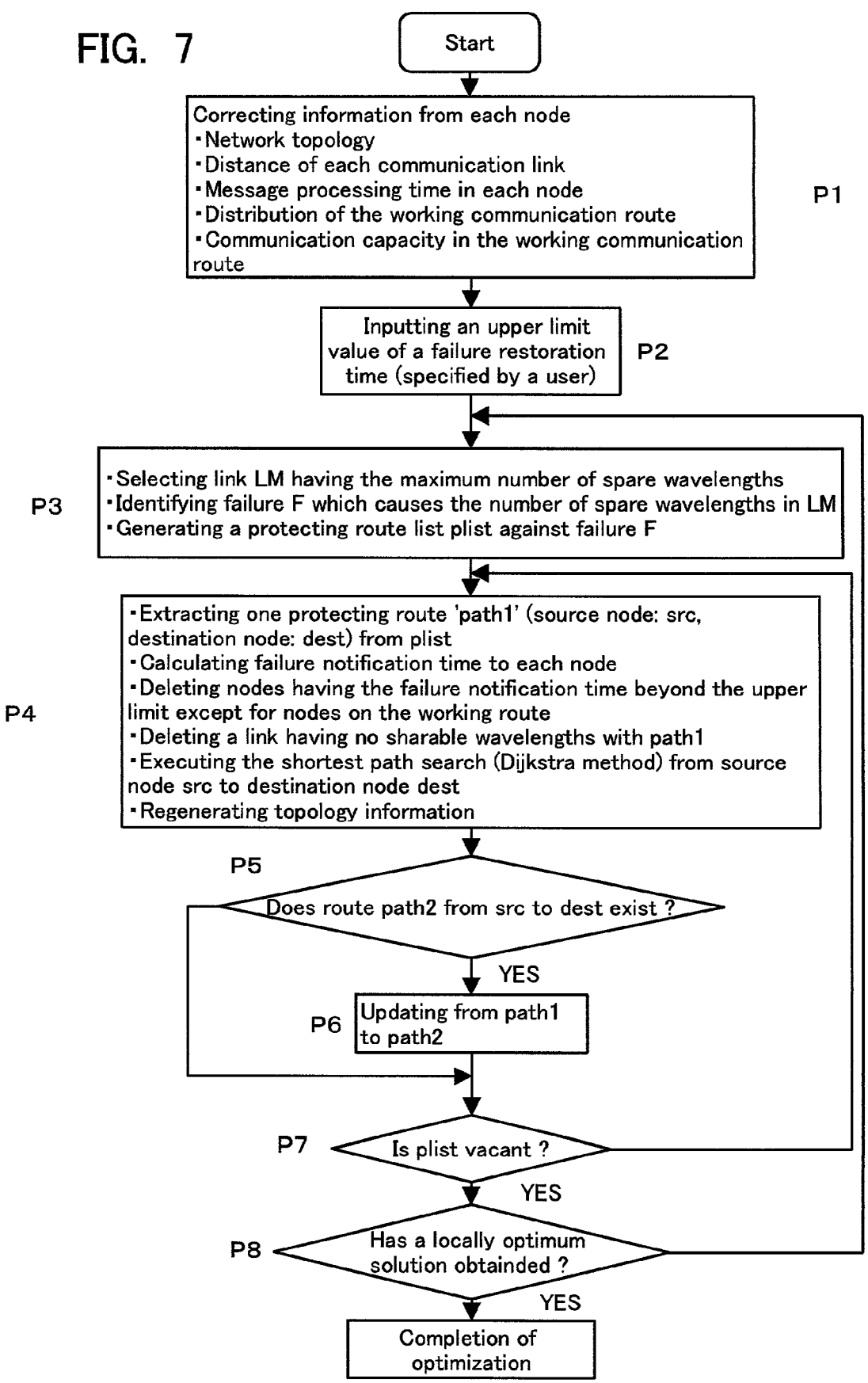
FIG. 7 shows an operation flow of an embodiment of a protecting route design method for a communication network according to the present invention.

In FIG. 7, there is shown an embodiment of operation flow in accordance with the protecting route design method of the present invention, to be executed in network management system 10 shown in FIG. 4.

In FIG. 7, when the protecting route design processing of the communication network is started, network management system 10 collects the following information from each node (procedure P1).

network topology
distance of each communication link
distribution condition of the working communication route (i.e. the route condition currently in use)
communication capacity in the working communication route Then, an upper limit value of a failure restoration time is input by a user (procedure P2).

Based on these information sets, network management system 10 first determines an object link for updating (procedure P3). As a criterion to determine this object link for updating, a link LM having the maximum number of spare wavelengths is selected.

Figure 8:
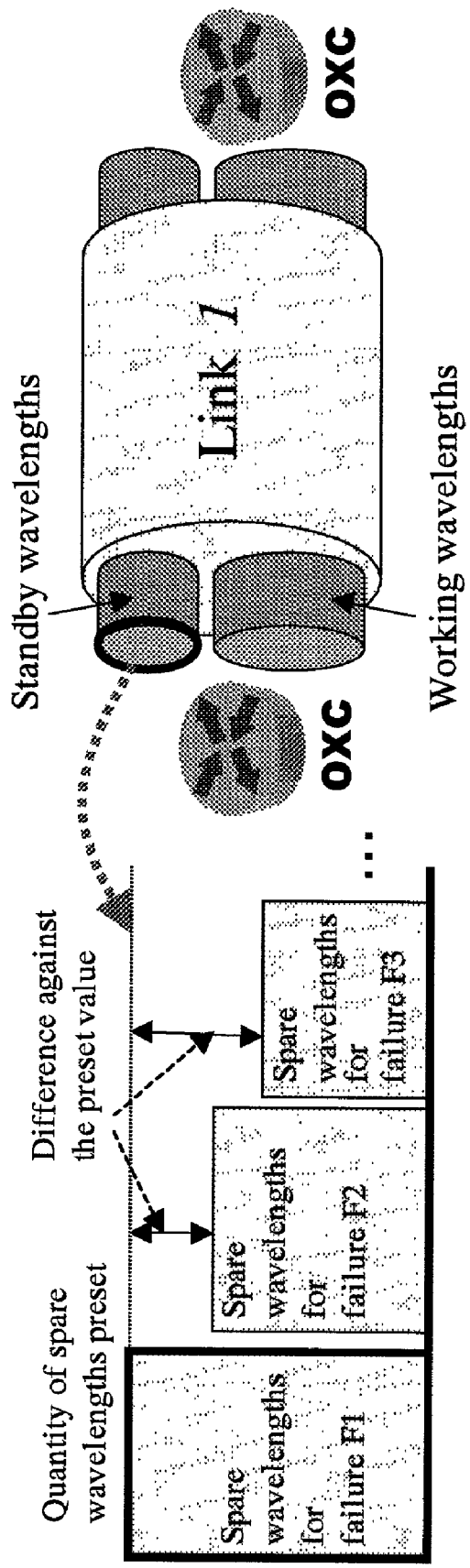
FIG. 8 shows an illustration on the quantity of spare wavelengths.

More specifically, as shown in FIG. 8, spare wavelengths are prepared for maintaining communication in case a working wavelength becomes unavailable due to a failure, where the capacity of the spare wavelengths is determined considering the worst case of failure.

Accordingly, among the links having predetermined spare wavelengths, the link LM having the maximum number of spare wavelengths is selected as an object for updating.

Here, as described above, spare wavelengths in each link is determined considering the largest damage produced by any failure. However, the number of spare wavelengths provided for each link are different.

When it is desired to determine only one object link for updating, it may be acceptable to select any link. However, it is better to select so that the number of spare wavelengths of a link becomes uniform in an entire network. For this purpose, the link having the maximum number of spare wavelengths is selected as an object for updating.

In procedure P3, network management system 10 identifies a failure F which causes to use the entire spare wavelengths of the selected link LM having the maximum number of spare wavelengths. In the example shown in FIG. 8, a failure F1 causes the number of spare wavelengths in the link LM.

Then, a protecting route list 'plist' is generated against the above failure F identified as the cause of the number of the spare wavelengths.

Network management system 10 extracts one protecting route 'path1' from the above generated 'plist'. (Here, path1 is identified using a source node 'src' and a destination node 'dest'.) (procedure P4)

Then network management system 10 calculates a failure notification time required for transmitting from the failure detection node to respective nodes. Here, a model is provided for calculating the time required for transmitting a failure notification message from the failure detection node to respective nodes: The model is constituted by both a transit time in each link and a time consumed in each node for transmitting the failure notification message.

Figure 9:
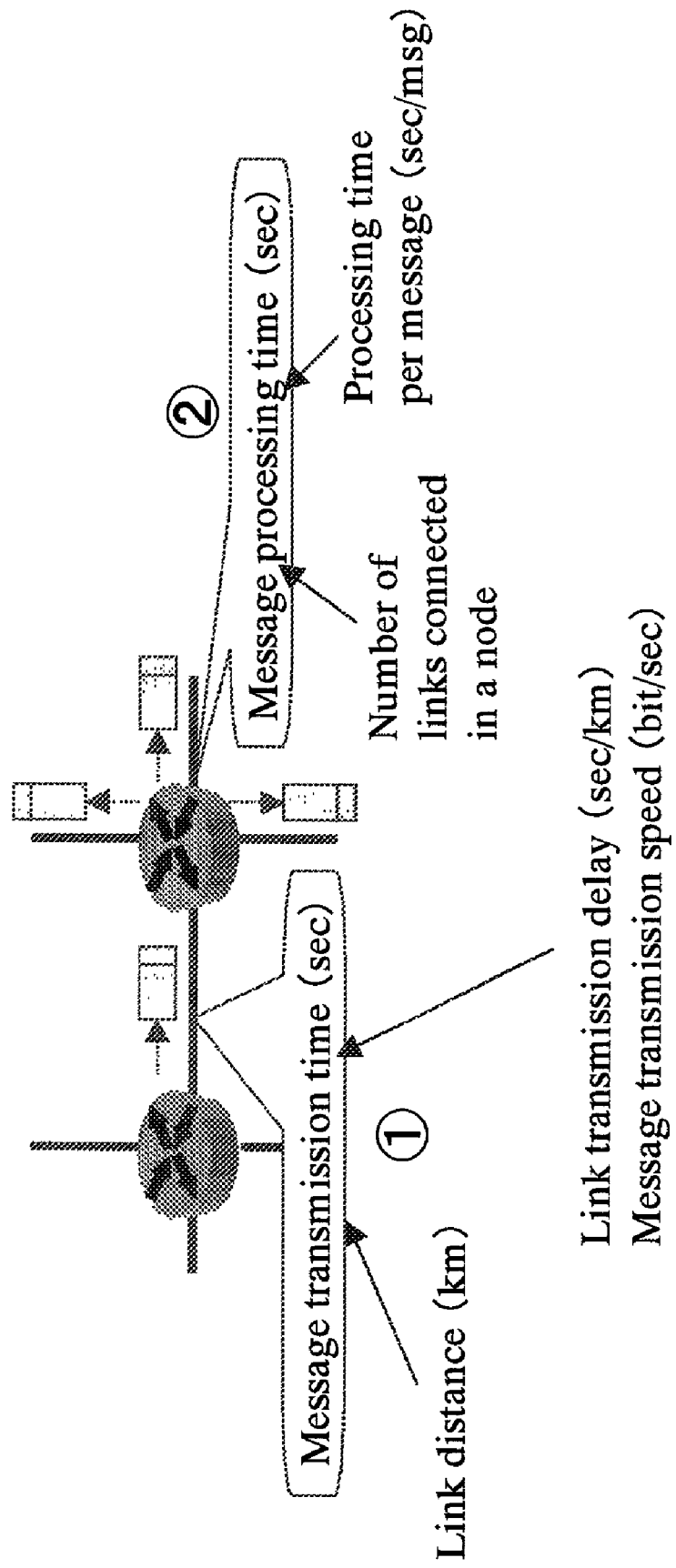
FIG. 9 shows a diagram illustrating a model for a calculation of failure notification time from a failed node to other nodes.

FIG. 9 shows an example of the model. In this model, there are considered a transmission time of a failure notification message in a link, 'delay(link)' ①; and a processing time of a failure notification message in a node, 'mproc(node)' ②.

The transmission time of the failure notification message, 'delay(link)' ①, is proportional to a link distance 'dist(link)'. The proportional constant 'α' is represented by the following formula, determined by the transmission delay time in optical communication (sec/km) and the communication speed (bit/sec).

$$\text{delay(link)} = \alpha * \text{dist(link)}$$

The specific value of the constant 'α' a is approximately 5.0e-6, which is derived from physical transmission delay of light 4.833e-6 (sec/km) when a communication speed is 155.52e6 (bit/sec).

Meanwhile, in regard to message reception and transmission processing included in the processing time of the failure notification message 'mproc(node)' ②, a processing time per message is considered. However, in a design stage, a worst time is taken into consideration because a flooding message in the event of a failure is processed in an arbitrary sequence.

Namely, because the failure notification message is processed sequentially one by one in an arbitrary order, it is unknown in the design stage in what number of sequence the message is processed. Therefore, assuming the message is processed lastly in any case, the time in this worst case is considered as a transit time within a node.

The total number of message reception links and transmission links is equal to the number of links 'deg(node)' connected to nodes. Therefore, the processing time of the failure notification message 'mproc(node)' ② is proportional to the number of links 'deg(node)', which is denoted by the following formula:

$$\text{mproc(node)} = \beta * \text{deg(node)}$$

Here, according to a simulation result of the present invention, a typical value of the constant 'β' is approximately 1.0e-3 (sec) per message.

From the transmission time of the failure notification message 'delay(link)' ① and the processing time of the failure notification message 'mproc(node)' ② obtained above, the failure notification time to each node is obtained.

Then, the nodes of which the failure notification time exceeds the limit previously specified by the user are deleted, except for the nodes along the working route.

Moreover, a link having no sharable spare wavelength with the protecting route 'path1' described above is also deleted. Hereafter, the sharing of spare wavelength is explained.

For example, in the event of a failure F in FIG. 8, when updating a protecting route p1 not passing through a link l to another protecting route which passes through link l, whether or not the spare wavelengths prepared in link l is sharable is determined.

Assuming that a failure F1 causes the number of spare wavelengths prepared in link l, it can be considered that if failure F is failure F1, protecting route p1 cannot share the spare wavelengths of link l. while if failure F is other failure F2 or F3, protecting route p1 can share the spare wavelengths of link l.

Then for a starting node 's' to a terminating node 't' on a working path, a shortest path algorithm (such as Dijkstra method) is performed to obtain the shortest path 'path2' from starting node 's' to terminating node 't'.

Here, a node recovery procedure is executed against the nodes which were deleted in the aforementioned process P4 because of the upper limit excess of failure notification time. This node recovery procedure is performed based on the topology information obtained in procedure P1.

Next, in case the shortest path 'path2' is obtained ('Yes' in procedure P5), the protecting route is updated to 'path2' from 'path1' having been extracted from 'plist' (procedure P6).

The above processing is carried out for all protecting route s extracted from 'plist' (procedure P7). If the result of this processing is a locally optimal solution 'Yes' in procedure P8), the processing is completed.

As described above, in procedure P4 of the present invention, nodes exceeding the upper limit of restoration time and links having no sharable spare wavelengths are once deleted in order to obtain the minimization of both the service restoration time and spare wavelengths.

According to the above procedure P4, an updating processing is carried out for all alternate communication routes only once. However, if this procedure is executed repeatedly, total spare communication capacity can be reduced further.

Namely, in FIG. 8, in order to obtain more effective network resources, updating of the protecting route s is carried out repeatedly when the minimization of the number of allocated spare wavelengths is executed. At this time, by assigning the protecting route consisting of spare wavelengths sharable to an object of the updating, monotone decreasing of the total number of spare wavelengths can be obtained.

Figure 11:
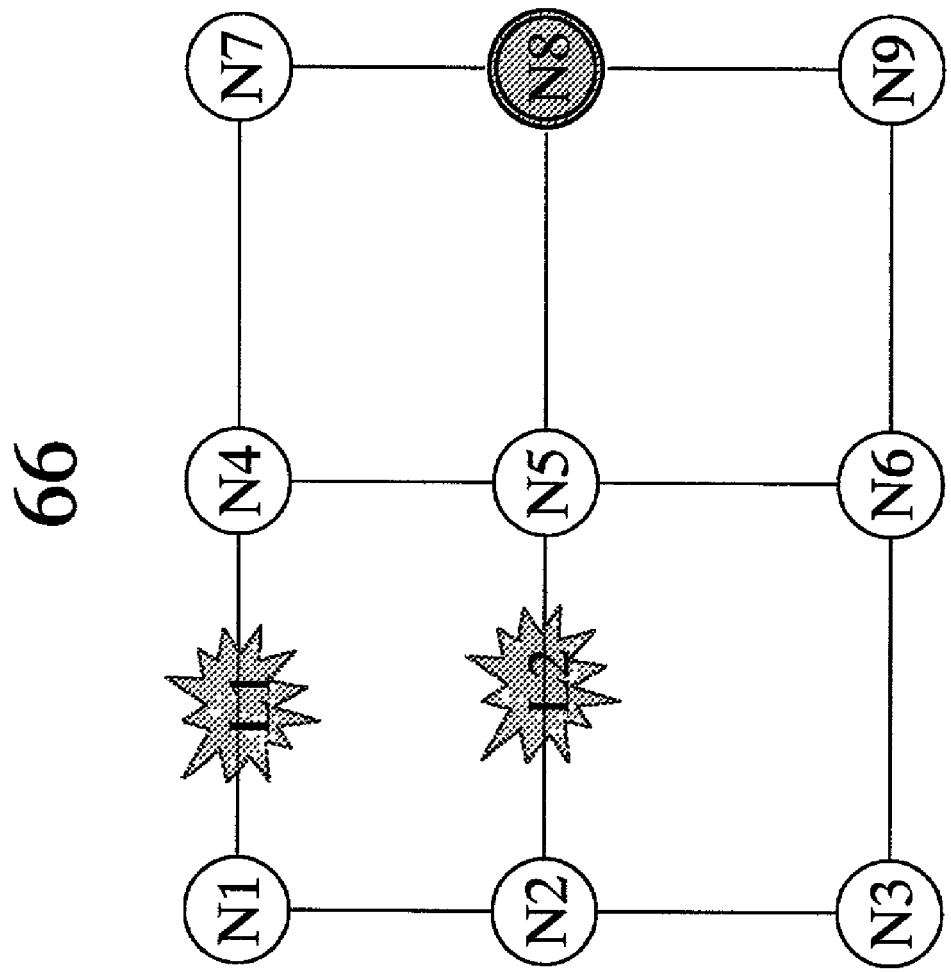
FIG. 11 shows a network topology diagram

FIG. 10 shows a data structure diagram as an embodiment of the present invention. The table owned by node N8 indicates a restoration time from a failure under a network topology 66 shown in FIG. 11, for use in determining to delete the nodes at which a failure notification time exceeds the upper limit in procedure P4 shown in FIG. 7.

In FIG. 10, there are shown a failure location 61; a node 62 which can detect this failure; an upper limit value 63 of the restoration time which was specified by the user; the shortest reception time 64 of a failure notification message calculated from both a message transmission delay in a communication link explained in FIG. 9 and a message processing time; and a time 65 assignable to a communication route switchover which is derived from a difference between the upper limit value 63 of the restoration time and the shortest reception time 64 of the failure notification message.

In the foregoing explanation, it is supposed that a time necessary for switching over a communication route in switch 100 is fixed in each optical cross-connect. Therefore, it is possible to calculate from communication route switchover time 65 the number of communication paths which can pass through node N8. For example, if node N8 becomes an object in investigating the restoration upper limit time when updating an alternate communication route, the number of communication paths can be obtained referring to communication route switchover time 65.

Figure 12:
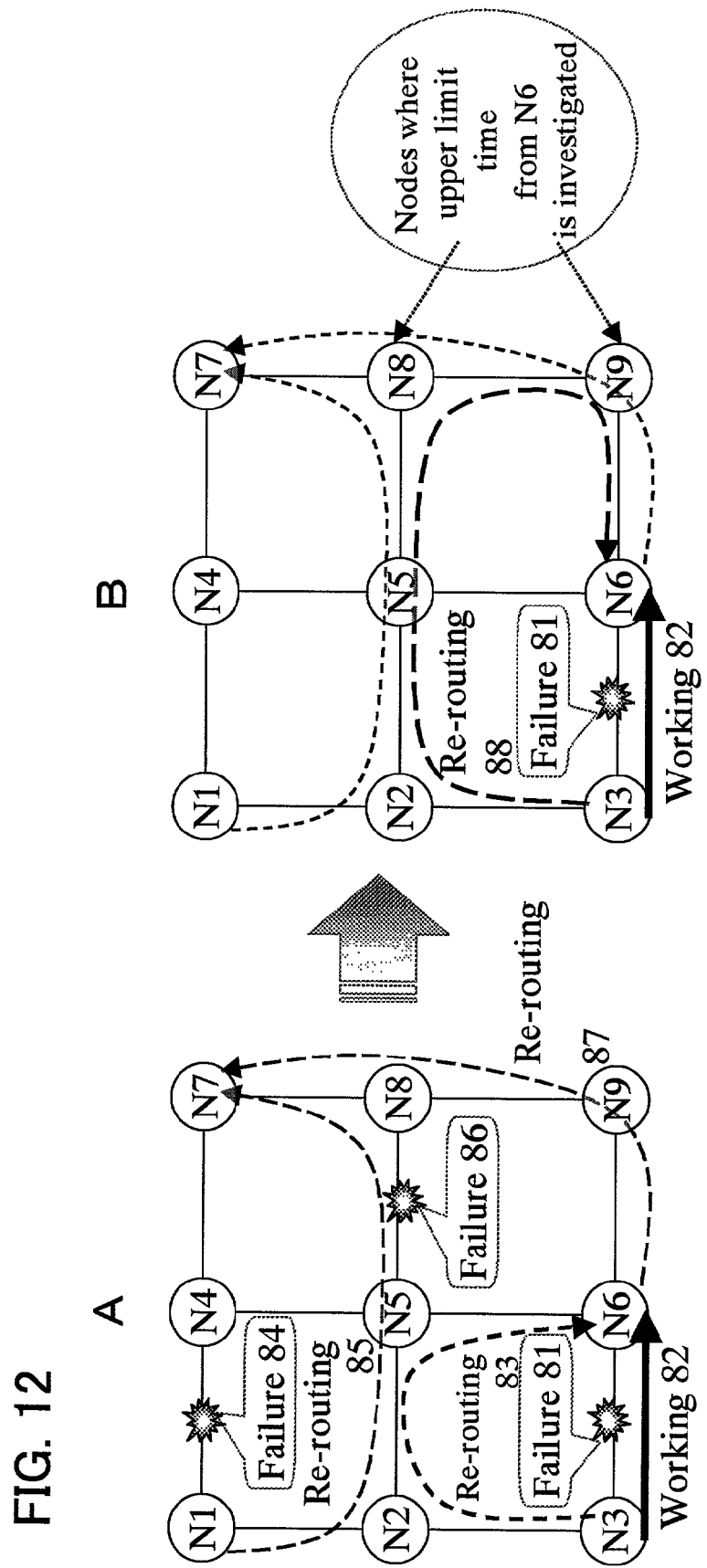
FIG. 12 shows an embodiment of the processing for reducing a spare wavelength capacity.

In FIG. 12, there is shown an embodiment of the processing for decreasing a spare communication wavelength capacity. In this figure of a network having nodes N1 to N9, the following protecting route s are shown: A protecting route 83 against a working route 82 which is damaged by a failure 81, and protecting route 85 having been set against failure 84 and protecting route 87 having been set against failure 86 (FIG. 12-A). In FIG. 12-B, protecting route 88 being updated from protecting route 83 is shown.

In order to minimize spare communication capacities, which is one of the object in designing a communication network, spare communication capacity is made sharable by updating from protecting route 83 to protecting route 88. At this time, node N8 and node N9 are newly added to the protecting route. For this reason, using the restoration time investigation table shown in FIG. 11, a restoration time condition of alternate communication route 88 is investigated using a protecting route switchover time and a transfer time of a failure notification message from node N6 having detected failure 81 on working route 82.

As explained above, the object of designing a protecting route of a communication network can be achieved, under the condition of not exceeding the required failure restoration time, by calculating a transfer time of a failure notification message and a route switchover time for each node along the alternate communication route.

In FIG. 13, an example of an information table showing the alternate communication route information as a result of the update performed in the manner shown in FIG. 12. In FIG. 13, there are shown a transmission node 72 and a reception node 73 respectively damaged by a failure on a link L1 connecting nodes N1 and N4, corresponding to FIG. 12. Further, a protecting route 74 corresponding to the combination of damaged nodes; transmission node 72 and reception node 73 is shown.

As an example, assuming a damaged transmission node 72 is N4 and a damaged reception node 73 is N1 (wherein data flows from node N4 to node N1), a path 141 and path 412 are established against failure 84.

Based on this alternate communication route information table shown in FIG. 13, network management system 10 sets route switchover information corresponding to each failure into a protecting route table 114 in message controller 102 of corresponding optical cross-connects illustrated in FIGS. 5 and 6.

Figures 14A, 14B:
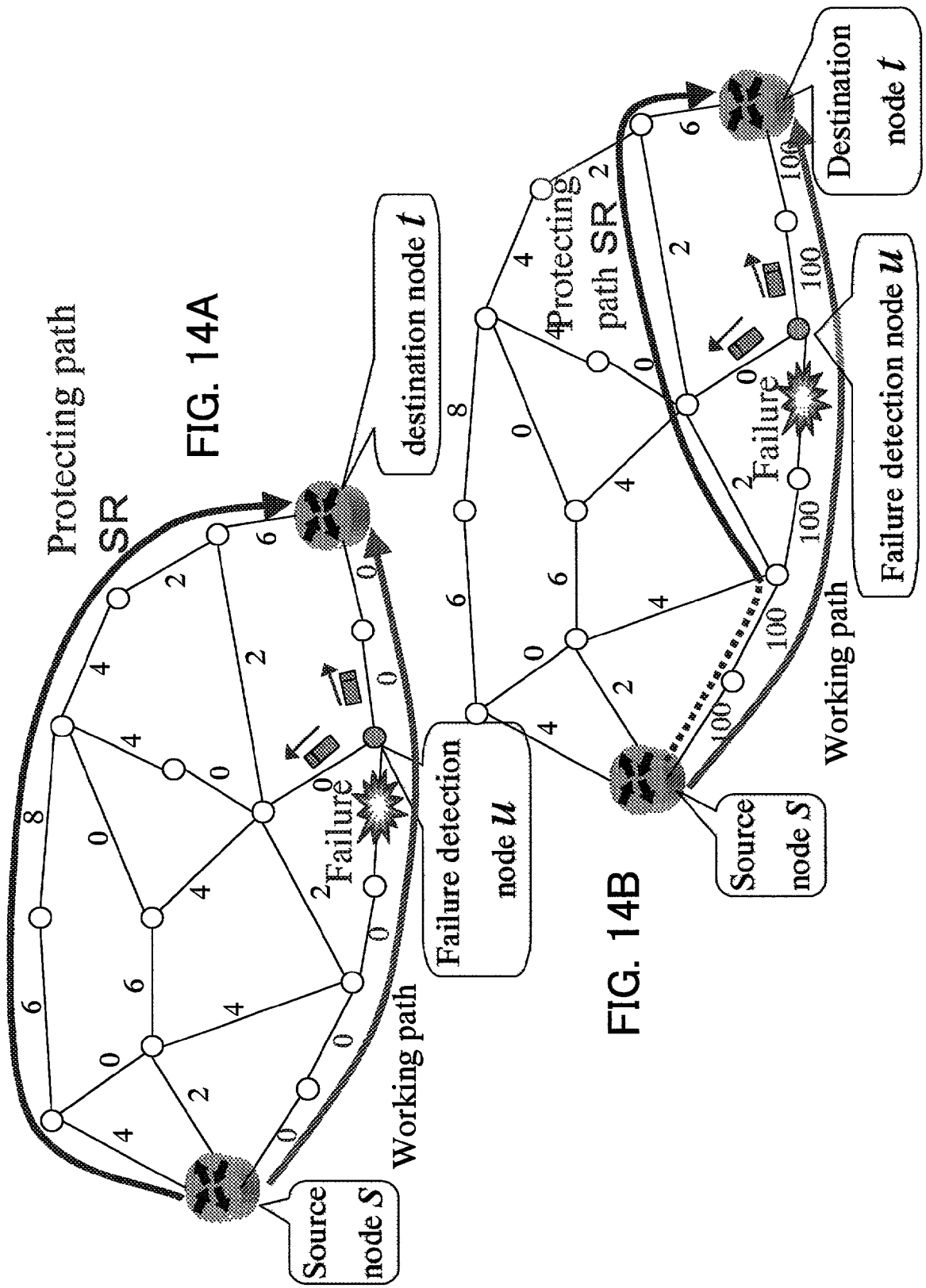
FIG. 14 shows a protecting route search enabling to share the spare communication capacity in regard to a working path originated from a start node (s) to a terminating node (t).

In FIG. 14, another embodiment of a protecting route search method which can share spare communication capacities is shown in regard to a working path from a starting node 's' to a terminating node 't'. Figures corresponding to links show the amount of sharable spare communication capacities.

For example, '0' denotes the spare communication capacity is not sharable with a protecting route against other failures. Priority is given to a link having greater value in this figure when calculating an alternate path from starting node 's' to terminating node 't'.

It is desirable for an alternate path to be searched in the pre-plan type failure restoration system to have a sharable spare communication capacity, as well as to have a short transfer time of a message from a failure detection node. Also, it is necessary to select an alternate path which passes through a link having as greater figure as possible in FIG. 14 and locates as near as possible to a failure detection node 'u'.

However, because there is no spare communication capacity maintained in a working path, every spare communication capacity which is sharable in a link on a working path is '0'. This may produce an alternate path undesirably located far from the failure detection node, such as an alternate path SR shown in FIG. 14-A.

To cope with this problem, only when searching an alternate path as shown in FIG. 14-B, a large spare communication capacity, such as an amount of 100, is temporarily given to each link located on a working path. In this condition, if an alternate path from starting node 's' to terminating node 't' is searched, the searched alternate path mostly overlaps the working path because links having greater spare communication capacity are selected with priority. This produces a shorter alternate section (solid line portion of the alternate path). As a result, the failure notification time can be reduced with a sharable spare communication capacity.

In the above procedure, an alternate path which does not pass through a link of spare communication capacity '0' is searched. In addition, once the alternate path is determined, the temporary spare communication capacity (100) allocated on the link of the working path is deleted.

In the present invention, the transfer time of a failure notification message is calculated using an optical transmission delay, a route switchover time in a node, an input/output message processing time in a node, etc. Each time parameter depends greatly on an object network scale or equipment capability consisting nodes.

Also, actual figures of these time parameters differ with at least one digit, to six digits when large, depending on the system, etc. For this reason, it is not necessary to calculate for whole parameters. Instead, it is possible to neglect some of the parameters within a reasonable range depending on the object communication network. This results in a substantial calculation time reduction in designing.

In the table shown in FIG. 15, there are shown examples of typical parameters as well as items on design object of a protecting route in a communication network. In regard to optical communication delay, the delay time per distance unit is fixed as 4.833 μsec/km.

Also, in the table shown in FIG. 16, a relation is shown particularly paying attention to a network scale and a node switchover method.

Assuming the network scale is a scale of metropolitan area having a path length of 30 km, the message transmission time becomes approximately 145 μsec. However, considering that approximately 5 msec is necessary for the optical signal switchover, the message transmission time (or communication delay) can be negligible.

On the other hand, in case of a network on a national scale in North America, the path length is approximately 3,000 km resulting in the communication delay of 14.5 msec, while the switchover of electric signal requires one three-millionth of the communication delay time only. Therefore the switchover time is negligible in this case.

Message processing time in a node can also be decreased when a CPU having high processing capability is loaded in the node.

The inventors of the present invention performed a simulation for the evaluation of the protecting route design method according to the present invention, using a topology of 5×5 mesh network (25 nodes) which is used in typical design evaluation.

The following parameters are used in this simulation: the link length is a random value not more than 500 km (347.2 km in average); the message processing time in a node is 1.0 msec, the link transmission delay is 5.0 μsec/km; the number of working paths is 6,000.

Figure 17:
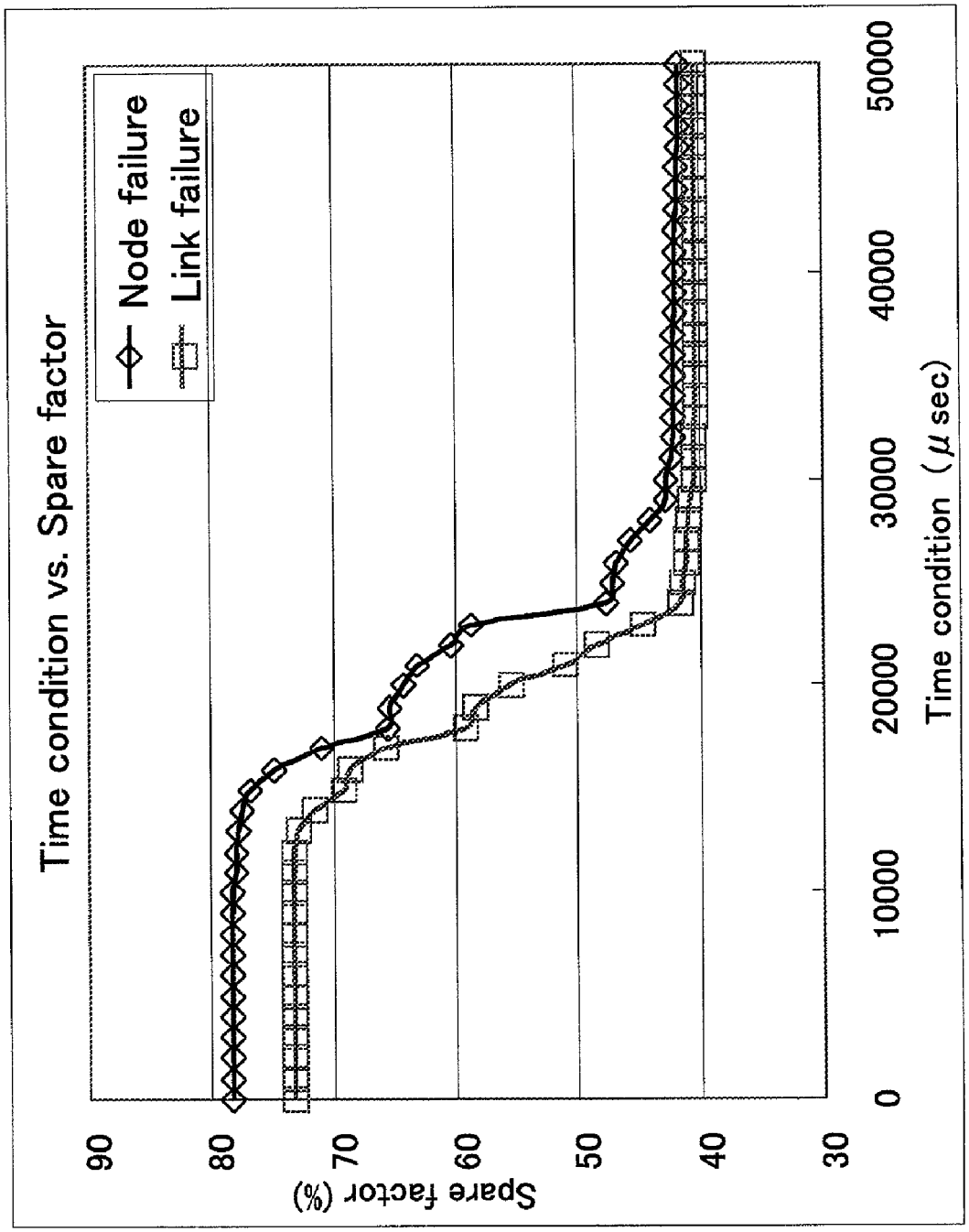
FIG. 17 shows a diagram indicating an effect to a spare factor caused by an upper limit of failure notification time.

First, in FIG. 17, there is shown a spare factor affected by a given upper limit of failure notification time. Here, a spare factor denotes a ratio of the number of spare wavelengths against the number of working wavelengths. A smaller figure of the spare factor means better design efficiency.

With the increase of the given upper limit of failure notification time, which is the relaxation in condition, the spare factor decreases and is converged at the point of approximately 30 msec. Meanwhile, in a conventional '1+1' system or a ring protection system in SONET/SDH, a pare factor of 100% is necessary.

In contrast, according to the present invention, assuming an object of service restoration time of 50 msec, and a half of the object time, i.e. 25 msec, is assigned to a route switchover time, the spare factor can be suppressed less than 50%: 47.2% for a node failure and 41.3% for a link failure.

Furthermore, in FIG. 18, there are shown figures of a failure notification time and a spare factor in the cases whether or not the time restriction is preset in a similar environment. When the time restriction is not given, a protecting route is set at each end node of a path, requiring the failure notification time of approximately 37 msec in maximum. On the other hand, when the time restriction is given (as 25 msec), the increase of spare factor is not large, which is less than 3.5%, because sufficient sharing of spare wavelengths is possible against most failures.

Having been described according to the accompanied drawings, the protecting route design method according to the present invention enables high-speed restoration processing with a minimized total spare communication capacity in a failure restoration system, by switching over a route according to an alternate communication route information predetermined in each node when a single communication link or a node fails in the communication network. Thus an efficient operation on communication network resources can be achieved.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A protecting route design method for a communication network including a plurality of nodes having preset information on a protecting route to switch over in parallel from a working route thereto when link or node failure occurs, according to a failure notification message including failure location information being transmitted from a failure detection node to each node, the protecting route design method comprising the steps of:
    searching a protecting route which can minimize a transfer time of the failure notification message from the failure detection node; and
    then, updating the searched protecting route to a protecting route having a spare communication capacity sharable for a different failure and having a route switchover time to be completed within a given time limit,
    wherein a switchover time to the protecting route in each node is calculated from a difference between a given restoration time limit and the transfer time of failure notification message to the each node.

2. The protecting route design method according to claim 1, wherein calculation of a switchover time to a protecting route is selectively employed depending on a topology or a scale of an object communication network, a node equipment specification, and a communicatiou system.

3. A protecting route design method for a communication network including a plurality of nodes having preset information on a protecting route to switch over in parallel from a working route thereto when link or node failure occurs, according to a failure notification message including failure location information being transmitted from a failure detection node to each node, the protecting route design method comprising the steps of:
    searching a protecting route which can minimize a transfer time of the failure notification message from the failure detection node; and
    then, updating the searched protecting route to a protecting mute having a spare communication capacity sharable for a different failure and having a route switchover time to be completed within a given time limit,
    wherein the transfer time of failure notification message from the failure detection node is calculated from a summation of a transmission delay time of the failure notification message being transmitted on communication links and an input and output processing time of the failure notification message processed in the each node, and wherein a switchover time to the protecting route in each node is calculated from a difference between a given restoration time limit and the transfer time of failure notification message to the each node.

4. A protecting route design method for a communication network including a plurality of nodes having preset information on a protecting route to switch over in parallel from a working route thereto when link or node failure occurs, according to a failure notification message including failure location information being transmitted from a failure detection node to each node, the protecting route design method comprising the steps of:
    searching a protecting route which can minimize a transfer time of the failure notification message from the failure detection node; and
    then, updating the searched protecting route to a protecting route having a spare communication capacity sharable for a different failure and having a route switchover time to be completed within a given time limit, wherein another protecting route is searched affording priority to a link having a large sharable spare communication capacity between the end nodes of the route, so as to reduce a total spare communication capacity and a route search time, and wherein, at the time of the search of another protecting route by affording priority to a link having a large sharable spare communication capacity, a sharable spare communication capacity value exceeding any value assigned to another link is temporarily afforded to a link on a working route, so as to reduce a transfer time of the failure notification message from the failure detection node to each node along the protecting route.

5. A protecting route design method for designing protecting route information on a protecting route, and presetting the designed protecting route information in a plurality of nodes provided in a communication network, before occurrence of a link or node failure in the communication network, wherein the plurality of nodes switch over in parallel from a working route to the protecting route on the basis of the protecting route information present in the plurality of nodes when link or node failure occurs, according to a failure notification message including failure location information, transmitted from a failure detection node to each of the plurality of nodes, the protecting route design method comprising the steps of:

搜 searching by a network management system, provided in the communication network, for a preliminary protection route, the preliminary protecting route for minimizing a transfer time of the failure notification message which is transmitted from a node detecting link or node failure;

updating the searched preliminary protecting route to the protecting route having a spare communication capacity sharable for a different failure, the protecting route having a route switchover time to be completed within a given time limit; and presetting the protecting route information on the updated protecting route in the plurality of nodes, the protecting route information including the failure location information associated with an identifier of the corresponding protecting route, the failure location information indicating a location of the link or node failure in the communication network.

6. The protecting route design method according to claim 5, wherein a restoration time of the protecting route is obtained by calculating a summation of the transfer time of failure notification message to each node and a switchover time to the protecting route in each node, then by extracting the maximum value of the summation for entire nodes along the protecting route.

7. The protecting route design method according to claim 5, wherein another protecting route is searched excluding a link which has not any sharable spare communication capacity between the end nodes of the route, so as to reduce a total spare communication capacity and a route search time.

8. The protecting route design method according to claim 5, wherein another protecting route is searched affording priority to a link having a large sharable spare communication capacity between the end nodes of the route, so as to reduce a total spare communication capacity and a route search time.

9. The protecting route design method according to claim 5, wherein another protecting route is searched excluding a node at which a transfer time of the failure notification message exceeds a predetermined restoration time, so as to reduce a route search time.

10. The protecting route design method according to claim 5, wherein calculation of a transfer time of a failure notification message is selectively employed depending on a topology or a scale of an object communication network, a node equipment specification, and a communication system.

11. The protecting route design method according to claim 5, wherein the transfer time of the failure notification message from the failure detection node is calculated from a summation of a transmission delay time of the failure notification message being transmitted on communication links and an input and output processing time of the failure notification message processed in the each node.

* * * * *